May 17, 1955     R. R. WALTON ET AL     2,708,303
FELTING MANUFACTURE Filed March 9, 1953     7 Sheets-Sheet 1

INVENTOR
RICHARD R. WALTON
WALTER B. CLIFFORD, DECEASED
BY BESS SWENSON CLIFFORD AND
ANNE C. POST, EXECUTRICES.

BY
ATTORNEY

May 17, 1955  R. R. WALTON ET AL  2,708,303
FELTING MANUFACTURE

Filed March 9, 1953  7 Sheets-Sheet 2

INVENTOR
RICHARD R. WALTON
WALTER B. CLIFFORD, DECEASED
BY BESS SWENSON CLIFFORD AND
ANNE C. POST, EXECUTRICES.
BY
ATTORNEY

INVENTOR
RICHARD R. WALTON
WALTER B. CLIFFORD, DECEASED
BY BESS SWENSON CLIFFORD AND
ANNE G. POST, EXECUTRICES.

ATTORNEY

May 17, 1955   R. R. WALTON ET AL   2,708,303
FELTING MANUFACTURE

Filed March 9, 1953   7 Sheets-Sheet 4

INVENTOR
RICHARD R. WALTON
WALTER B. CLIFFORD, DECEASED
BY BESS SWENSON CLIFFORD AND
ANNE C. POST, EXECUTRICES.
BY
ATTORNEY

May 17, 1955 R. R. WALTON ET AL 2,708,303
FELTING MANUFACTURE
Filed March 9, 1953 7 Sheets-Sheet 5

INVENTOR
RICHARD R. WALTON
WALTER B. CLIFFORD, DECEASED
BESS SWENSON CLIFFORD AND
ANNE C. POST, EXECUTRICES.
BY
ATTORNEY

May 17, 1955  R. R. WALTON ET AL  2,708,303
FELTING MANUFACTURE
Filed March 9, 1953  7 Sheets-Sheet 6

INVENTOR.
RICHARD R. WALTON
WALTER B. CLIFFORD, DECEASED
BY BESS SWENSON CLIFFORD AND
ANNE C. POST, EXECUTRICES.

BY 
ATTORNEY

May 17, 1955 R. R. WALTON ET AL 2,708,303
FELTING MANUFACTURE
Filed March 9, 1953 7 Sheets-Sheet 7

INVENTOR
RICHARD R. WALTON
WALTER B. CLIFFORD, DECEASED
BY BESS SWENSON CLIFFORD AND
ANNE C. POST, EXECUTRICES.
BY 
ATTORNEY

United States Patent Office 2,708,303
Patented May 17, 1955

2,708,303

FELTING MANUFACTURE

Richard R. Walton, Boston, Mass., and Walter B. Clifford, deceased, late of Boston, Mass., by Bess Swenson Clifford, Boston, and Anne C. Post, Wayland, Mass., executrices, assignors to L. S. Adams Engineering, Inc., Boston, Mass., a corporation of Massachusetts Application March 9, 1953, Serial No. 341,078

39 Claims. (Cl. 28—5)

This invention relates to methods and apparatus for interfelting fibers, such as in the fulling of a batt of fibers taken from a wool card, and composed in whole or in part of feltable fibers, such as wool, to produce a fulled material known commercially as a flat felt of the type used in the manufacture of shoes, slippers, paddings, insulation, etc. The method and apparatus disclosed herein are useful as well for the felting of woven fabrics, and for other purposes which will appear.

The objects of the present invention are to perform the fulling or felting, as the case may be, in open widths by a process which is continuous and unusually rapid as compared with conventional practices and which uses comparatively inexpensive, lightweight, small and compact equipment which may be attended by few operatives and hence at a minimum of labor cost. The invention further seeks to perform an effective fulling operation on less expensive materials, if desired, than have been usable heretofore, such as batts containing large percentages of synthetic, cotton or other non-feltable fibers or waste materials.

The batt to be fulled, composed of a number of webs doffed from a card and superimposed on each other, is loose and fluffy and has little tensile strength or resistance to ply separation. The finished felt made from it is, by comparison, highly compacted and exhibits substantial tensile strength in all directions as well as good resistance to ply separation. In appearance, the most marked difference between the starting and the finished material is a substantial reduction in thickness from the initial fluffy batt, which is usually more than an inch and may be several inches in thickness, to the felt having a thickness of a small proportion of its former thickness, usually a fraction of an inch. However, the enhancement in tensile strength is not due to the mere compacting as evidenced by reduction in thickness, but is attributable to the migration of the fibers or movement relative to each other in the general directions of their lengths so that they become interfelted or closely intertwined with each other.

A reduction in thickness of the batt, with a consequent compacting of the fibers, may be obtained in a number of ways without producing the fiber migration or interfelting necessary for adequate tensile strength. Thus, merely wetting the batt thoroughly will reduce its thickness very appreciably and to a dimension more closely approximating the thickness of the finished felt than the thickness of the starting batt, but no fiber migration will, of course, occur simply from wetting the batt. Application of pressure to the batt will likewise reduce its thickness, but without fiber migration. The application of vibratory movement simultaneously with the application of substantial pressure, while the fibers are heated and moistened, will effect a reduction in thickness accompanied by a certain degree of fiber migration. But the product, while in appearance similar to that of a finished felt, may lack any substantial tensile strength or resistance to ply separation because of inadequate fiber migration.

The latter treatment is known as "hardening" and is employed in the felt industry as an initial step in treating a batt of loose carded fibers so it can be handled during the subsequent fulling operation. In general practice, such hardening is accomplished on a vibrating platen machine in which successive batts, arranged in layers separated by intervening layers of canvas, are subjected to moisture at elevated temperature, as by steaming, and the platens are vigorously shaken to apply vibratory motion as the batts are compressed under the weight of the platen. According to certain prior patents, such hardening is also said to be accomplished by the use of superimposed vibrating rolls, employing adequate pressure for the purpose, but so far as we are aware, commercial hardening is almost exclusively performed on platen-type apparatus as of the present day. Such hardening, however obtained, does not produce the fiber migration necessary for the the tensile strength required of a completely fulled material and, in practice, the hardened material is thereafter fulled usually for a matter of hours in a so-called "kicker" type machine to obtain fiber migration adequate for the tensile strength required.

Our experiments have shown, furthermore, that hardening a batt by so compacting it under the action of substantial pressure, vibratory motion, heat and moisture, which is time consuming and costly, is also unnecessary and even a step backward in obtaining the desired interfelting. The batt is frequently more difficult to full properly than if it had not initially been hardened.

According to the present invention, preliminary hardening may be entirely dispensed with as a necessary preliminary treatment and the vibratory action may be applied directly to the batt of fibers as it is made up from carded webs and then thoroughly wetted. At this stage, the batt operated on by the initial vibrating rolls, as will be described, may be in substantially the loose, fluffy condition in which the webs of which it is composed were delivered from the card, except as the batt is compacted as the result of liquid saturation. In the preferred embodiment of the invention, roll pressure applied during the first stage is light and preferably little more than is necessary to transfer the vibratory pulsations from the rolls to the batt. In this way, substantial interfiber migration is accomplished rapidly, thereby immediately increasing the tensile strength of the batt very materially and conditioning the batt for a further and final fulling operation which may be more vigorous and accompanied by the application of more substantial pressures. The entire process is continuous and rapid.

Several forms of the present invention are hereafter described to afford various ways of obtaining the desired vibrations and of so handling the batt that the vibrations are effectively imparted to it.

This application is a continuation-in-part of application Serial No. 12,668 filed March 2, 1948, now abandoned, and of application Serial No. 113,448 filed August 31, 1949.

Figure 1:
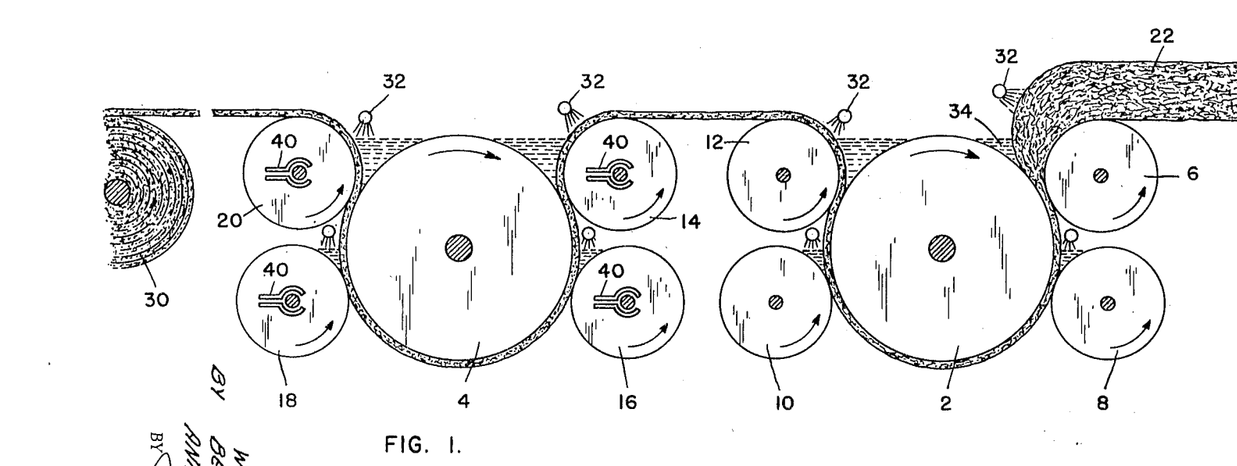
Fig. 1 is a diagrammatic side elevation view showing typical apparatus embodying the present invention for completely fulling a batt in one pass through a series of rolls.

Referring to Fig. 1, the machine illustrated consists of two large rolls 2, 4, the roll 2 having rolls 6, 8, 10 and 12 adapted for peripheral engagement therewith. The roll 4 similarly has four small peripherally disposed rolls 14, 16, 18 and 20. A batt 22, composed of webs taken directly from a wool card, is introduced to the machine over roll 6 and through the nip between rolls 2 and 6, thence around roll 2 in peripheral engagement therewith through successive nips between the roll 2 and peripheral rolls 8, 10 and 12. From roll 12 the batt leaves roll 2 and passes over to roll 14 where it is conducted around roll 4, passing between four nips of roll 4 with rolls 14, 16, 18 and 20 respectively. The finished batt completely fulled is wound up at 30.

The successively engaging small rolls preferably apply varying amounts of pressure on the fabric as it passes through, increasing from an exceptionally light pressure to a considerably stronger pressure. For convenience, this may be accomplished by mounting the shafts of the small rolls, as typified by the rolls 6 and 8 in Fig. 2, in spring pressed bearings 46 carried in frame members 44, so that the rolls 6 and 8 are yieldingly urged against the roll 2 with a pressure that is adjustable as indicated by the adjustment screws 48. As an example of one set of operating conditions which we have employed in practice for processing a batt 90 inches wide at a rate of approximately 10 to 30 feet per minute, depending upon the type of felt being made, we adjust roll 6, which presents the initial nip through which the batt passes, to apply a pressure of about 0.3 pound per linear inch of face contact. The successive nips at rolls 8, 10 and 12 apply an increasing pressure of about 0.4, 0.5 and 0.6 pound per inch respectively, and the rolls contacting roll 4 also increase the pressure, applying sequentially pressures of the order of 0.6, 0.7, 0.8 and 1.0 pound per inch.

The batt is wet and heated as it passes through these successive nips and, at least at the early stages, care is preferably taken to insure wetting to the saturation point. Sprays 32 are provided of which there may be one for each nip, as indicated. Preferably the sprays 32 associated with each nip provide water in sufficient quantity to collect as a pool at the entrance to the nip, as shown. Heat is supplied by using hot water in the sprays 32. The temperature may vary widely from 125° F. to nearly 212° F. but is preferably in the narrower range of 150° F. to 200° F. and in the embodiment illustrated the temperature of the water was about 165° to 170° F. at all nips.

The large rolls 2 and 4 are power driven by motors to be described to advance the batt at the proper speed, about 10 to 30 feet per minute in the embodiment illustrated. In addition to being driven forward, the large rolls 2 and 4 are also oscillated torsionally at a high frequency. We have found that 14,400 strokes (7200 complete oscillations) per minute to be satisfactory but this is merely illustrative of the order of magnitude of the oscillation frequency to be employed. The oscillation frequency should be in excess of 2000 O. P. M. and may be as high as ten times that amount and is preferably between 3000 and 10,000 O. P. M. The amplitude of these vibrations is preferably in the range of .08 to .32 inch depending on the stage of processing the batt. As the felting progresses and the batt becomes more compact, vibrations of greater amplitude and hence greater work input may be employed than can be tolerated by the batt in the earlier, very loose stage.

Pool 34 is agitated by the vibrations of roll 2, which vibrations may readily be detected upon immersing the finger in the pool.

Figure 2:
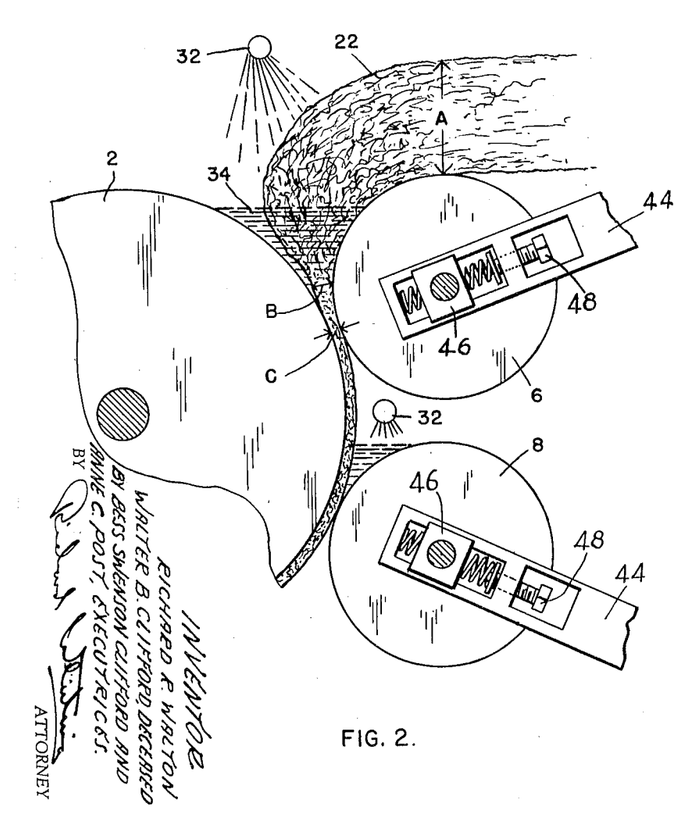
Fig. 2 is a diagrammatic elevation view of parts of Fig. 1, but on larger scale, indicating the mode of operation of the first two nips through which the batt passes.

Before processing, the dry batt 22 is soft and fluffy and has a thickness as indicated by A (Fig. 2). As the batt enters the pool 34, it is subjected to the high frequency vibrations which are transmitted by the pool 34. The vibration of the water facilitates its penetration into the batt which quickly absorbs water and becomes saturated. The thorough wetting of the batt immediately reduces its thickness to a dimension indicated at B.

The pressure applied by roll 6 is preferably extremely light and reduces the thickness of the batt only slightly in comparison with its entering thickness B, as indicated at C. The light pressure is sufficient, however, to assure that the vibratory motion of the roll 2 is transmitted through the batt. The complete saturation of the batt as it passes through the nips of rolls 2 and 6 aids in this process. The water fills the voids between the loose fibers and itself apparently serves to transmit pulsations throughout the depth of the batt.

Roll 6 revolves at the same peripheral speed as roll 2 and there is no drag on the surface fibers of the batt. This is accomplished either by a free idling of the roll 6 or by gearing or otherwise positively connecting it to the large roll to be rotated by it.

Rolls 2 and 6 necessarily express some water from the batt, but this may well be considered excess because the batt remains saturated with an increase in weight of the order of 500 per cent, as compared to its dry state.

The batt, thoroughly saturated with water, passes on to roll 8 which exerts slightly greater pressure than roll 6, and then under each of the successive rolls 10 and 12 with the pressure applied preferably being gradually increased.

At roll 2, the batt was transformed from its initial very loose, dry, fluffy condition into a fairly compact web having adequate tensile strength to be self-sustaining.

Figure 3:
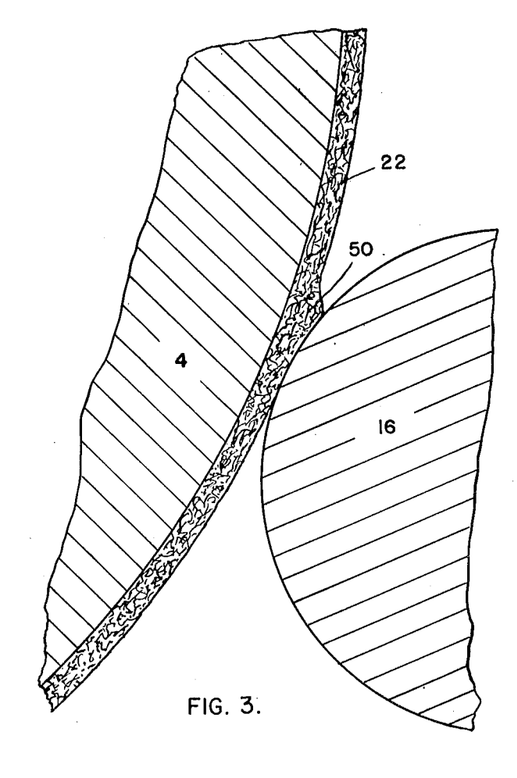
Fig. 3 is a diagrammatic elevation view on a still larger scale illustrating the braking action on the batt which may occur as the batt passes through certain nips in the machine.

At the initial nip with roll 4, through which the batt now passes, roll 14 preferably applies a pressure to the webs equal to or greater than did the roll 12 and the pressures increase through successive nips as stated. As was the case with previous nips, rolls 14, 16, 18 and 20 through which the batt now passes, also rotate at the same peripheral speed as that of the roll 4, so there is no slippage between the batt and the rolls. However, as an optional modification, each of these rolls, commencing with the roll 14, may exert a drag on the batt by being lightly braked, as indicated diagrammatically at 40, on each roll. As the result of this braking, if employed, the roll exerts a pull backward on that surface of the batt which it engages, and some of the batt may protrude slightly behind the roll, as indicated by the bulge 50 in Fig. 3. We have found that in this way, a further fiber migration may be obtained in the web being processed on the roll 4. Any slippage of the roll against the fabric as the result of this braking is to be avoided and to that end we provide a coarse friction surface on roll 4 and on the pressure rolls 14, 16, 18 and 20. This also assures that the fabric is positively gripped by the working rolls so that the oscillatory motion of the roll 4 is effectively transmitted to the fabric while it is firmly held by the pressure rolls.

After the fabric has passed around roll 4, it is wound on reel 30. As a quantitative illustration of the reduction in batt thickness experienced while being processed on the apparatus described, a dry batt of about 1½ inches thickness was reduced to 3/16 inch, by the water saturation at pool 34, and further reduced to 1/8 inch by the action of the pressure roll 6. The thickness of the final product after complete processing was slightly less than 1/10 inch.

The treatment to which the carded batt is subjected by the method of our invention is to be contrasted with the conventional hardening process on a platen with canvas separators between each layer. By this latter process, not only are the surface fibers kinked and tangled so as to inhibit thorough and complete felting, but also the entire fabric surface is simultaneously subjected to the same frictional forces which apparently prevents effective migration of the fibers by holding those which lie on the surface. By our invention in which the batt is worked by means of rolls, only a narrow strip of the batt is worked at any instant so that fibers may easily migrate from the working area into adjacent areas where the batt is substantially free from the pressure and forces of the rolls.

Because the pressure exerted by the smaller rolls disposed about large rolls 2 and 4 is variable, the apparatus may readily be adjusted for proper surface felting operations.

Although the apparatus illustrated vibrates the batt in a lengthwise direction by torsionally oscillating the large rolls, we do not limit ourselves to that type of vibration, as transverse or axial reciprocation may also be used.

In the modifications which follow, we have shown various ways of obtaining the desired oscillatory motion and applying it to the batt. We also include the use of conveyor belts which are well adapted for some uses. Where belts are employed they have some effect of confining the surface fibers, engaged by the belts, from migratory movement and as a consequence some hardening with less interfelting results. For that reason we prefer the open rolls but, within their limitations, belts also serve a useful purpose.

Figure 4:
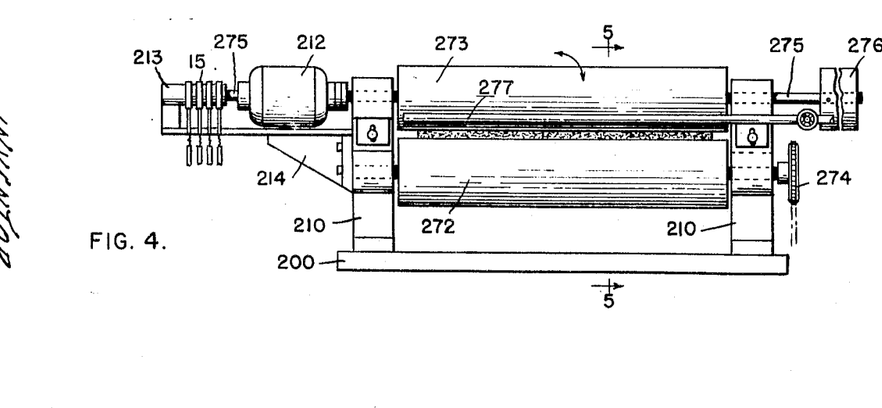
Fig. 4 is a view in elevation of a form of the apparatus having superimposed rolls.
Figure 5:
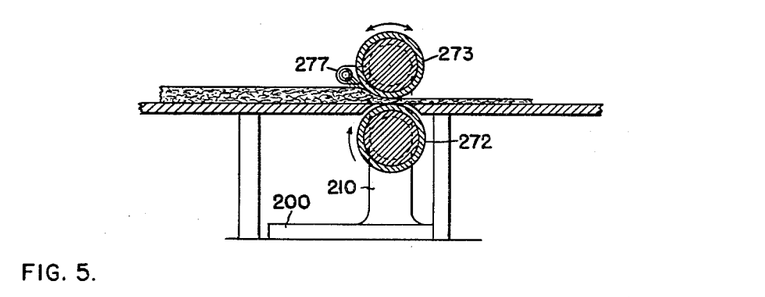
Fig. 5 is a sectional view taken along line 5—5 of Fig. 4.

Thus, in Figs. 4 and 5 there is shown a modification of the invention comprising a pair of pressure rolls, one of which is torsionally oscillated to apply high frequency vibrations to a batt as it is advanced between the rolls. In the form illustrated, this apparatus includes a suitable base 200 on which spaced, vertically extending frames 210 are mounted. As is best seen in Fig. 5, a batt is fed into the nip formed by an upper roll 273 and a lower roll 272, each of which is provided with a shaft rotatably supported by the side frames 210. The shaft of lower roll 272 is driven by means of a motor not shown whose shaft is coupled by a chain to the sprocket 274. A spray 277 is mounted in a suitable position to supply moisture to the batt as it enters the nip between the rolls. It is apparent as the lower roll is rotated the batt will advance, and will cause the upper roll to rotate.

Figure 6:
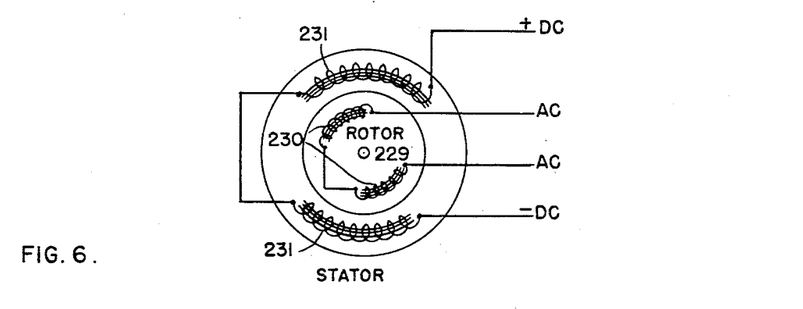
Fig. 6 is a wiring diagram of a motor used to oscillate the rolls torsionally.

The upper roll 273 and its shaft 275 are also torsionally oscillated at a rapid rate by means of an electric motor 212 which is mounted on one of the side frames 210 by a suitable bracket 214. The motor shaft is shown as being directly coupled at one end to the shaft 275. The other end of the motor shaft extends beyond the motor housing and is received in a bearing 213 carried on the bracket 214. A number of commutator rings 15 are provided adjacent this end of the shaft. Electrical energy is supplied to the motor windings through these rings so as to impart to the rotor of the motor an oscillatory motion whereby the roll 273 is torsionally oscillated while being rotated as the batt advances between it and roll 272. To achieve this oscillatory motion of the rotor 229, the windings of the motor are connected to sources of power as shown in Fig. 6. The rotor is provided with a pair of windings 230 which are connected to a source of alternating current while the stator is provided with a pair of windings 231 which are connected to a source of direct current. It will be seen that, with this arrangement, a constant field will exist about the stator windings, while a field whose polarity is changing at the frequency of the alternating current will exist about the rotor windings. The result is that the rotor oscillates at the frequency of the alternating current. Ordinarily, this frequency will be 60 O. P. S. which will cause the rotor to oscillate at a rate of 3600 O. P. M. This frequency may be increased or decreased substantially, and the invention contemplates frequencies to 20,000 O. P. M., for example. The amplitude of oscillation may be readily controlled by varying the amounts of electrical power supplied to the rotor windings and the stator windings of the motor 212.

In order to get a maximum of energy out of this system, including the motor 212 and the roll 273, means is provided for making the system resonant at the desired frequency. As shown in Fig. 4, a cylindrical mass 276 is mounted on the shaft in such a manner as to be adjustable along the shaft. The system can be made to resonate at a particular frequency by adjusting the mass along the shaft. This operation may be explained as follows. The motor will tend to oscillate the shaft carrying the roll and the mass. Because of its inertia, the mass 276 will at first oppose this rotation of the shaft and will tend to twist the latter because the shaft is resilient. The mass will begin to oscillate at a somewhat later time. Shortly, however, the oscillations of the mass 276 will be in phase with the oscillations of the motor 212 and the roll 273, thereby reinforcing the latter. In this system the drum constitutes a positively vibrated member and the mass is a freely vibrated element which accumulates energy and then transmits it to the drum.

Figure 7:
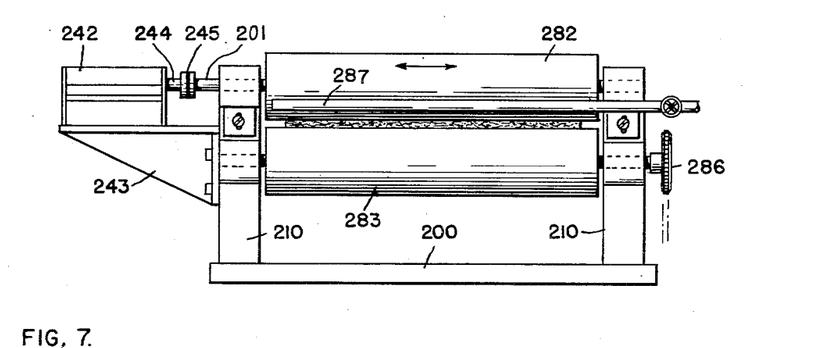
Fig. 7 is a view in elevation of another modification employing superimposed pressure rolls.

In the embodiment shown in Fig. 7 the upper one of a pair of rolls 282 and 283 is rapidly reciprocated transversely with respect to the direction of motion of a batt being treated. As was described with respect to Figs. 4 and 5, a lower roll 283 is provided with a shaft rotatably carried by the side frames 210, and is driven by a motor not shown through a sprocket 286. An upper roll 282 is provided with a shaft 291 that is slidably carried in the side frames 210. A spray 287 is arranged to saturate the batt as it enters the nip formed by the two rolls.

Figure 8:
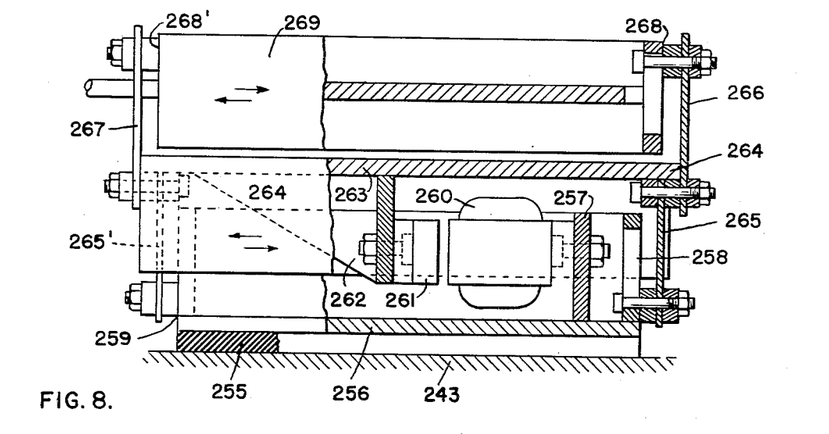
Fig. 8 is a diagrammatic view in elevation, and partly in section, of a motor used to vibrate the rolls transversely.
Figure 9:
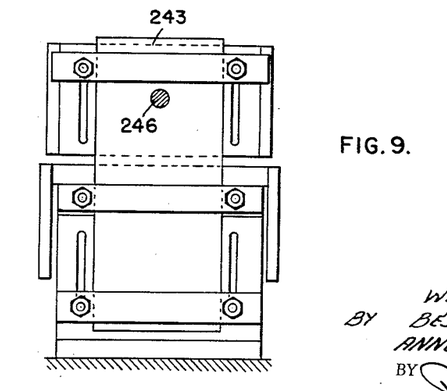
Fig. 9 is an end elevation of the motor shown in Fig. 8.

A vibratory motor 242 is supported by a suitable bracket 243 attached to one of the side frames 210 and has a shaft 244 which is connected through a coupling 245 to the shaft 291 of the roll 282. The details of the vibratory motor 242 are illustrated in Figs. 8 and 9. As shown, the motor comprises a box-shaped frame 256 mounted on an elastic pad 255 on the frame 243. The frame 256 is provided with vertically slotted end walls 258 and 259. An electro-magnet 260, to be supplied with an alternating current, is mounted inside the frame by being bolted to a partition 257 which is attached to the frame. An armature 261 which is adapted to be vibrated by the alternating magnetic field of the electro-magnet 260 is bolted to an arm 262 extending from a plate 263 which is a part of a second box-like frame 264 shown in inverted relationship with respect to the frame 256. The frame 264, which is known as the primary weighted mass of the system, is supported by a pair of vertical leaf springs 265 and 265' that are adjustably mounted on the end walls 258 and 259 by means of bolts fitted in the slots in said end walls. Other leaf springs 266 and 267 are bolted to the upper ends of the springs 265 and 265'. A third box-like frame 269, which is known as the secondary weighted mass of the system, is adjustably mounted on the leaf springs 266 and 267 by means of bolts passing through its slotted end walls 268 and 268' This uppermost box-like frame is provided with a horizontally extending member 270 which is connected to the shaft 244. The last-named shaft is connected to the shaft 291 as described above.

The motor 242 will function as follows to cause the rotating roll 282 also to vibrate transversely with respect to the direction of motion of the batt.

It will be apparent that each time the magnet 260 is energized the armature 261 and the box 264 will be moved toward the right, and each time the magnet is de-energized the spring action will move these parts to the left. It is contemplated that the rate of vibration may be from 3600 to 15,000 or thereabouts complete oscillations per minute. When the box frame 264 is moved to the right, the secondary weighted mass, namely the box frame 269, tends by reason of its inertia to remain at rest and the springs 266 and 267 which support it are therefore flexed toward the left. Thus these springs tend to return the primary weighted mass toward the left. It will be seen, therefore, that by proper adjustment of the length of the supporting springs of the two weighted masses, these may be made to vibrate in resonance so that the full energy delivered to the magnet 260 is transmitted to the shaft 244 as a very rapid and smooth vibration in a direction transverse to the fabric on which the roll 282 operates. In this manner, the effects of the phenomenon of resonance are taken advantage of to deliver sufficient energy to cause the roll 282 to vibrate as desired.

Highly effective apparatus and methods for torsionally oscillating rolls of this character are disclosed in patent of Edward W. Smith, No. 2,604,503, issued July 22, 1952.

Figure 10:
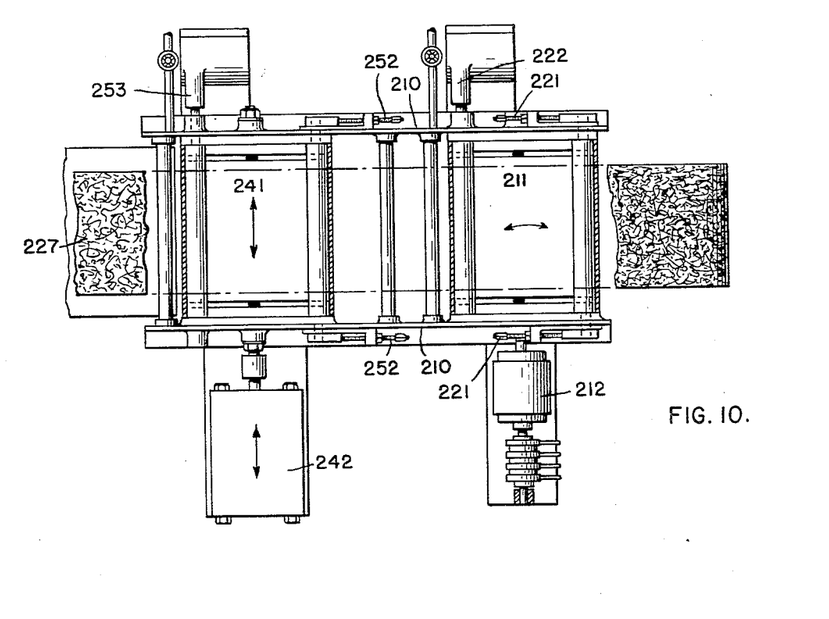
Fig. 10 is a plan view of an apparatus comprising separate stations for applying different types of vibrations to a batt held by a belt against the vibrating roll.
Figure 11:
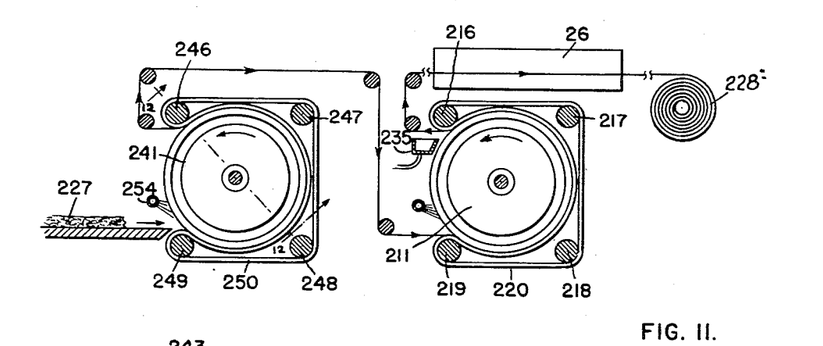
Fig. 11 is a diagrammatic side elevation view of the machine of Fig. 10.

Having thus separately described embodiments of the invention by means of which transverse vibrations and torsional vibrations may be applied to a batt to be felted, a still further modification comprising apparatus including a first station at which the batt is vibrated transversely, and a second station at which it is vibrated torsionally as the batt advanced through the apparatus, is illustrated in Figs. 10 and 11. In this modification the batt is held against the vibrating rolls or drums by means of a feed belt.

Referring to the figures, the batt 227 is shown advancing from left to right. The apparatus comprises side frames 210 which extend vertically from a suitable base not shown. The side frames carry suitable bearings in which the shaft of a roll or drum 241 is slidably mounted. The vibratory motor 242 is coupled to the roll 241 as described in connection with Fig. 7 and roll 282. Four small rolls 249, 248, 247 and 246 are disposed about the larger roll and are provided with shafts rotatably journaled in the side frames 210. These rolls are positioned about the roll 241 so that a feed belt 250 entrained about them will contact a substantial portion of the arcuate surface of the roll 241. A spray 254 is provided to saturate the batt 227 as it enters the nip formed between the roll 249 and the roll 241.

To advance the batt about the roll 241 as the latter is transversely vibrated by motor 242, the roll 246 is driven by a suitable variable speed drive shown at 253. The ends of the roll 246 are provided with flanges similar to those indicated by the numeral 223 in Fig. 12. The feed belt 250 is engaged between these flanges and disks, similar to the discs 224 of Fig. 12, which are mounted at the ends of the shaft or roll 241 so as to be freely rotatable thereon. The batt being treated is carried between the feed belt 250 and the roll 241 and will cause the latter to rotate in a manner similar to that described below in connection with the roll 211. As may be seen in Fig. 10, the shaft carrying the roll 247 is adjustably journaled in the side frames 210 so that the screws 252 may be manipulated to vary the pressure of the feed belt 250 on the roll 241.

The station at which the batt is vibrated by a torsionally oscillating roll is shown on the right in Figs. 10 and 11. It also comprises a large roll 211 having a shaft journaled in bearings in the side frame 210 and four smaller rolls 216, 217, 218 and 219 which are disposed about the roll 211 so that a feed belt 220 entrained about the rolls will engage a substantial portion of the arcuate surface of the roll. The pressure of the feed belt on the roll may be regulated by manipulating the screws 221 by means of which the shaft of roll 217 is adjustably mounted in the side frames 210.

The roll 216 is the roll which causes the feed belt 220 and the batt to advance. This roll is driven by means of a variable speed drive shown at 222. The roll 211 is also advanced in a rotary direction by friction coupling between it and the roll 216, as may be seen in Fig. 12. Flanges 223 are provided at each end of the roll 216. A disk 224 having a friction surface is mounted loosely on the shaft of the roll 211 at each end thereof so as to rotate freely on the said shaft. It will be noted that the flanges 223 and the disks 224 engage the feed belt 220 between them so that the feed belt is advanced by the rotation of the roll 216. Since the batt is carried between the feed belt and the surface of the roll, the latter will be rotated as the batt is advanced around it.

Figure 12:
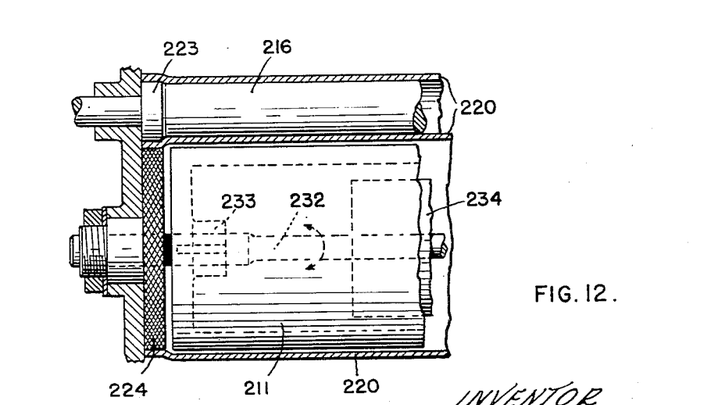
Fig. 12 is a sectional view of details of a part of the apparatus taken on line 12—12 of Fig. 11.

Referring still to Fig. 12, the details of construction of the roll 211 show it as being provided with a hub 233 which is keyed to a shaft 232. This shaft is coupled to the shaft of the motor 212 so as to be driven thereby. The motor 212 functions in the manner previously described in connection with the embodiment of the invention shown in Fig. 4. A circular mass 234 carried on the shaft 232 is fixed to the shaft to rotate therewith, and is also arranged for sliding motion along the shaft so that its distance from the hub 233 may be varied.

Since the motor 212 is wired in the manner shown in Fig. 6, the application of power to the motor in the prescribed fashion will cause its rotor, and the shaft 232, to oscillate torsionally. As the shaft and the roll are oscillated, the mass 234, because of its inertia, tends to oppose the motion of the shaft on the first cycle of oscillation of the latter. However, as this action proceeds, the mass 234 will oscillate in phase with the motor and the shaft so that the energy absorbed by the mass will be transferred to the roll. Thus, a resonant system is provided so that the desired amplitudes of vibration can be achieved. The resonant frequency of the system can be controlled by adjusting the mass 234 along the shaft 232.

Referring again to Figs. 10 and 11, a batt of fibers 227 is advanced into the nip formed between the roll 249 and the roll 241 and is sprayed as it advances by hot water or steam. The batt is carried around the roll 241 by the feed belt 250, the roll being transversely vibrated by the motor 242 while it rotates. The fibers in the batt are held between the feed belt 250 and the drum so that the vibratory motion is transmitted to them. After leaving the left-hand station in Figs. 10 and 11, the batt is guided into the nip between the roll 219 and the drum 211 again being sprayed as it enters the nip. The batt is carried around the drum 211, being held between the drum and the feed belt 220. The drum is torsionally oscillated as it rotates and the oscillatory motion of the drum is transmitted to the fibers in the batt. The batt emerges between the roll 216 and the drum 211. A trough 235 is positioned adjacent the point of emergence so as to catch any liquid squeezed out of the batt at this point. After the batt leaves this station, it is guided to a station shown at 26 where it may be subjected to such operations as dyeing, drying, trimming or the like before being coiled as shown at 228.

The batt may consist of feltable fibers, or a mixture containing feltable and non-feltable fibers. It may be desirable to treat a preformed batt by conducting it to the drum where a supply of loose fibers would be added to the batt at the point at which it comes within range of the roll pressure and so incorporated into the material to provide, for example, a surface of more expensive material than that from which the body of the fabric is formed.

Figures 13, 14:
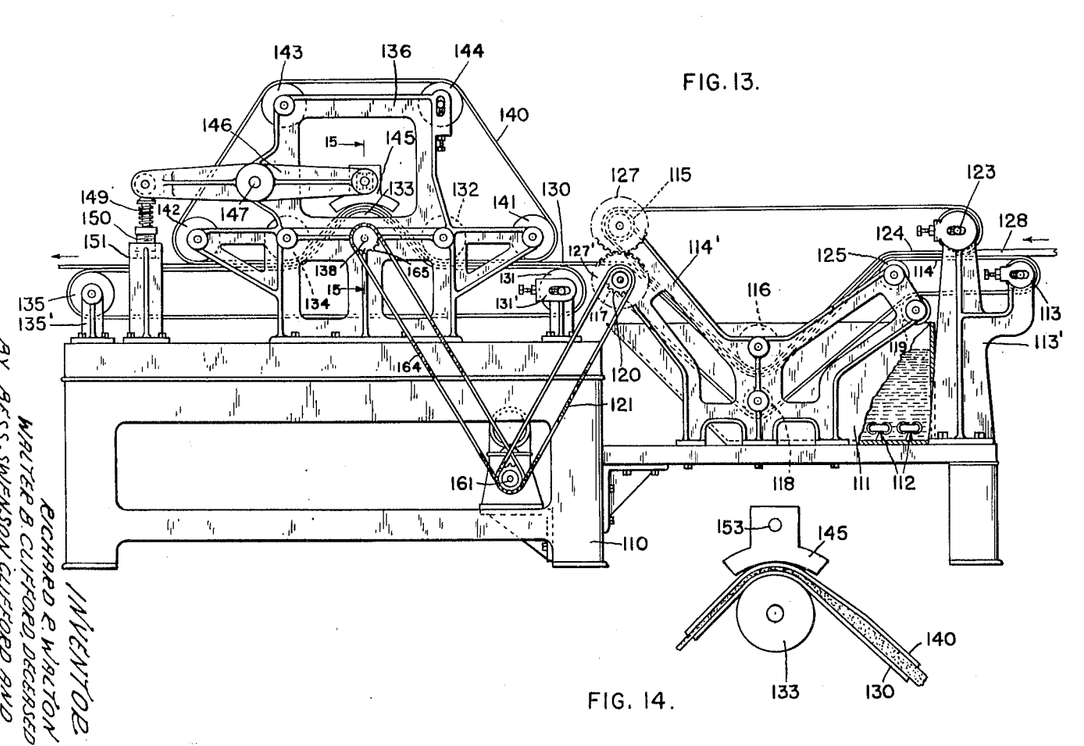
Fig. 13 is a view in side elevation of a further modification in which the batt is held between a pair of belts and carried through a moistening station and then a vibrating station.
Fig. 14 is a fragmentary view showing a batt of fibers advancing through the station at which vibrations are applied.

In Figs. 13, 14, 15 and 16 a modification is shown in which the batt of fibers is moistened with hot water or steam at one station and then is introduced between conveyor belts and carried past a station at which vibratory motion is imparted to the fibers. Referring to Fig. 13, the machine illustrated comprises a main frame or base 110. The moistening station is shown on the right-hand in Fig. 13 and the station at which vibrations are applied to the batt is shown toward the left. The moistening station includes a tank 111 which is mounted on the base 110 and may be either partially filled with water heated by means of steam coils 112 disposed in the tank or operated as a steam chamber. A batt 128 is carried through the tank 111 between a pair of foraminous conveyor belts 114 and 124 which are guided and supported by a plurality of rolls positioned about the tank. The lower belt 114 is trained about a guide roll 113 adjustably supported by a bracket 113' mounted on the frame 110. From the roll 113 the belt 114 passes over a roll 125, downwardly into the tank 111 and beneath a third roll 116, upwardly and around roll 117 located above the tank, downwardly beneath roll 118, upwardly over roll 119 and back around roll 113. The rolls 114 to 119 are carried on shafts journaled in the sides of a frame 114' mounted on the machine base. The roll 117 serves as a drive roll, and thus is mounted fast to its shaft which carries a sprocket wheel 120 at its outer end engaged with a sprocket chain 121.

The upper belt 124 passes about an adjustable roll 123, also supported from the base by the bracket 113'. From this point it passes over the roll 115, down into the tank 111, and under the roll 116 in the same fashion as the lower belt 114. The belt 124 then passes upwardly and around the roll 125 and back to roll 123. The roll 115 serves as a drive roll for the upper belt and is thus fast to its shaft journaled in the frame 114', which shaft carries a gear 127 meshed with the gear 127' fixed to the shaft to which sprocket 120 is fixed.

Thus a fibrous batt 128 placed on the belt 114 at the right of the machine will be carried through the tank 111 between the foraminous belts 114 and 124. The batt thus moistened with hot water or steam is delivered by the bands 114 and 124 to other conveyor belts 130 and 140 by means of which it is advanced through a stage at which vibratory motion is imparted to the fibers of the batt.

The conveyor belts 130 and 140 are also entrained about a plurality of rolls. Thus, the lower belt 130 passes around a roll 131 supported by an adjustable bracket 131' mounted on the base 110. Both the upper belt 140 and the lower belt 130 pass under rolls 141 and 132, and over a driven roll 133. From the latter roll the belts pass under a roll 134. The belt 130 then passes around a roll 135 mounted by means of a bracket 135' on the base 110 and back around roll 131. The belt 140 passes around a roll 142 and from there upwardly over a roll 143, an adjustable roll 144, and back under the roll 141. All of the rolls, with the exception of rolls 131 and 135, are rotatably mounted on shafts journaled in side frames 136 and 137 mounted on the base 110. As was indicated above, roll 133 is the driving roll in this arrangement. It is mounted fast on a shaft 138 provided with a sprocket wheel 165 which is driven by a chain 164. The sprockets 165 and 120 are driven from a main drive shaft 161 on which appropriate sprockets are mounted.

The details of the mechanism employed in this modification for imparting vibratory motion to the fibers in a batt are now described. As can be seen in Fig. 14, the belts 130 and 140 cooperate to carry the batt 128 into the nip between the roll 133 and a curved presser plate 145. The presser plate 145 is mounted fast to a shaft 153 (Fig. 15) slidably carried in bearings 154 and 155 provided at the inner free ends of a yoke 146 (Fig. 13) which is pivotally supported by pins 147 journaled in side frames 136 and 137. The outer end of the yoke 146 is connected to a vertical rod 149 which extends downwardly through an adjustable bushing 150 carried by a bridge 151 supported on the frame 110. A compression spring surrounds the rod 149 and bears upwardly on the outer end of the yoke 146 to force the presser plate 145 downwardly toward the roll 133. The amount of pressure exerted by the spring can be regulated by means of the bushing 150.

Figure 15:
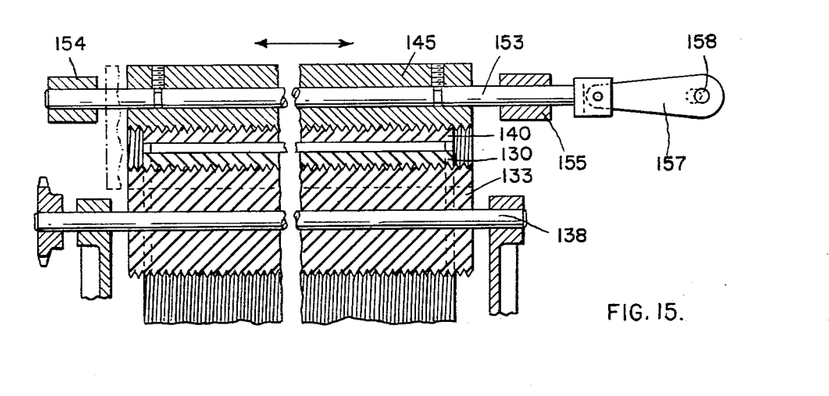
Fig. 15 is a sectional view on line 15—15 of Fig. 13.

Referring to Fig. 15, the outer surfaces of the belts 130 and 140 are provided with longitudinally extending corrugations. The surface of the roll 133 and the lower concave surface of the presser plate 145 are also corrugated so that the corrugations of the upper belt are keyed to those of the presser plate and the corrugations of the lower belt are keyed to those of the roll. Since the roll 133 is fast to its shaft 138, and as the shaft is journaled in the side frames 136 and 137, the lower belt is restrained from motion in a direction transverse to the axis of the roll 133. Similarly, because of their interengaging corrugations, the upper belt 140 and the presser plate 145 will move together. The inner batt engaging surfaces of the belts are rubberized in the preferred form of the apparatus.

Figure 16:
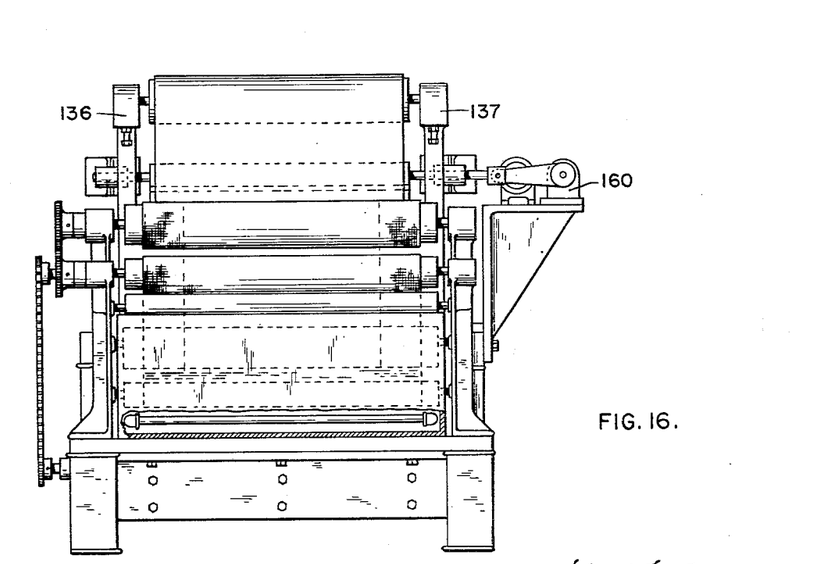
Fig. 16 is a view in end elevation of the modification of Fig. 13.

It was pointed out above that the presser plate 145 is fixed to the shaft 153 which is slidably carried in the bearings 155 and 154 in yoke 146. An end of the shaft 153 is connected to an eccentric strap 157 which encircles an eccentric 158 mounted on the shaft of a motor 160, as seen in Fig. 16. Thus, the presser plate will be vibrated laterally by the motor 160 and will carry the band 140 with it because of the interfitting corrugations on the shoe and the band. Since the lower belt 130 is held against transverse motion, it will hold the fibrous batt so that the vibratory motion of the presser will be transmitted to the fibers.

As is clearly shown in Figs. 13 and 14, the radius of curvature of the lower concave surface of the presser plate 145 is greater than the radius of curvature of the convex surface of the roll 133. Thus, these curved surfaces cooperate to provide a nip through which the belts 130 and 140 are led in converging paths. The batt between the belts will be led to the nip thus formed and interfelting by migration of the fibers will take place in this zone because the vibratory motion of the presser plate is transmitted to the fibers. It will be seen that a relatively narrow transversely extending section of the batt will be operated on at a given time. Because of the relation between the curved surface of the presser plate and that of the roll 133, the section of the batt being treated will be flexed as it is vibrated.

We do not wish to confine ourselves to any particular theory of operation. Whatever the principles involved may be, water saturation to the extent indicated, high frequency vibrations and very gentle pressure application, gradually increasing, produces unusually effective results and is the preferred modification. However, the other modifications are well adapted to some uses.

The method and apparatus illustrated and described may be employed for other purposes than the manufacture of non-woven felt from batts. Woven felt or other surface napped materials may be felted by our method and apparatus.

As further modifications of this invention, we have found that our method and apparatus are exceptionally effective for treatments involving the application of chemicals to felts or fabrics while they are subjected to simultaneous vibration and immersion in liquid.

Thus, the addition of a limited quantity of any of the usual detergents to the water through which the batt passes on its way to the vibration imparting elements not only enhances the effectiveness of the inter-fiber migration necessary for interfelting but, if the quantity of the detergent is adequate, a highly effective scouring and degreasing operation occurs by reason of the combined action on the fibers of the detergent and the high frequency vibrations.

We claim:

1. The method of fulling a textile sheet material which includes the steps of introducing the material into the nip of a pair of rolls, rotating the rolls to feed the material through the nip, vibrating the batt by subjecting at least one of the rolls to oscillations at a high frequency of the order of several thousands of complete oscillations per minute, applying hot water to the material at a place where the material is vibrating so that the vibrations are effective to insure wetting the material to the point of saturation, and pressing the rolls against the material at the nip with a pressure adequate to effect feed and vibration but inadequate substantially to inhibit the fibers from migratory movement.

2. The method of fulling a textile sheet material which includes the steps of introducing the material into the nip of a pair of rolls, rotating the rolls to feed the material through the nip, wetting the material to the point of saturation and subjecting at least one of the rolls to vibrations at a high frequency of the order of several thousands of complete vibrations per minute, while leaving both surfaces of the material free and unconfined on both sides of the nip, so that fibers of the material which project through the material to lie on its surfaces on opposite sides of the nip will be free for migratory movement and any substantial hardening of the material, without fiber interfelting, is avoided.

3. The method of fulling a textile sheet material which includes the steps of introducing the material into the nip of a pair of rolls, rotating the rolls to feed the material through the nip, and vibrating the material by subjecting at least one of the rolls to resonant torsional oscillations at a high frequency at the rate of from about 3600 to 7200 complete oscillations per minute.

4. The method of fulling a textile sheet material which includes the steps of introducing the material into the nip of a pair of rolls, rotating the rolls to feed the material through the nip, vibrating the material by subjecting at least one of the rolls to resonant oscillations at a high frequency of the order of several thousands of complete vibrations per minute, delivering hot water into a pool collecting at the nip of the rolls on the entering side so that the material and the water pool vibrate rapidly as the material passes through the pool thereby quickly effecting wetting of the material in an amount equal to many times the dry weight of the material.

5. The method as defined in claim 4 in which the rolls are pressed against the material at the nip with a limited pressure adequate to squeeze from the material going through the nip no more water than will leave the material upon emergence with water equal to many times the dry weight of the material.

6. The method of fulling a textile sheet material which includes the steps of introducing a partially fulled batt into the nip of a pair of rolls, at least one of which rolls is oscillating at a high frequency of the order of several thousands of complete oscillations per minute, power driving one of the rolls at a predetermined rate of peripheral speed so that the batt is fed through the nip without slippage against said roll at a speed equal to said predetermined speed, idling the other roll of said pair so that it rotates at said predetermined speed without slippage against the batt but with a substantial resistance to such rotation so that the surface of the said roll pulls and drags on the surface of the batt which it engages.

7. The method of completing the operation of fulling a batt composed at least in part of feltable fibers, which includes the steps of introducing a partially fulled batt into the nip of a pair of rolls, vibrating at least one of said rolls with oscillations at a high frequency of the order of several thousands of complete oscillations per minute, power driving one of the rolls at a predetermined rate of peripheral speed so that the batt is fed through the nip without slippage against said roll and at a linear speed equal to said predetermined peripheral speed, idling the other roll of said pair, applying a substantial amount of friction to resist the rotation of said idling roll, the coefficient of said friction being less than the coefficient of friction between the surface of said idling roll and the surface of the batt which it engages so that the batt drives the idling roll at a peripheral speed equal to said predetermined rate by pulling the roll against the friction which resists its rotation.

8. The method of fulling a batt composed at least in part of feltable fibers, which includes the steps of introducing a batt saturated with hot water into a first nip between a pair of rotating rolls, vibrating the batt by subjecting at least one of the rolls to high frequency oscillations of the order of several thousands of complete oscillations per minute, pressing the rolls against the batt at said first nip with a limited pressure not substantially greater than that required to feed the batt through the nip without slippage, thereafter further processing the partially fulled batt by passing it through a subsequent nip between a pair of rotating rolls, again vibrating the batt by subjecting at least one of the rolls of said subsequent nip to high frequency oscillations and pressing the rolls against the batt with a pressure substantially exceeding the pressure on the fabric at said first nip, and thereafter repeating the said further processing until the fulling is completed.

9. The method of fulling a batt composed at least in part of feltable fibers, which includes the steps of introducing the batt into the nip of a pair of rolls, rotating the rolls to feed the batt through the nip, wetting the batt, and subjecting at least one of the rolls to vibrations at a high frequency of the order of several thousands of complete vibrations per minute.

10. The method of fulling a batt composed at least in part of feltable fibers, which includes the steps of introducing the batt into the nip of a pair of rolls, rotating the rolls to feed the batt through the nip, wetting the batt, and vibrating the batt by subjecting at least one of the rolls to a torsional oscillation at a high frequency of the order of several thousands of complete oscillations per minute.

11. The method of fulling a batt composed at least in part of feltable fibers, which includes the steps of introducing the batt into the nip of a pair of rolls, rotating the rolls to feed the batt through the nip, vibrating the batt by subjecting at least one of the rolls to resonant oscillations at a high frequency of the order of several thousands of complete oscillations per minute, and wetting the batt in proximity to the nip so that the high frequency vibration imparted to the batt by the rolls aids in wetting the batt to the saturation point.

12. The method of fulling a batt composed at least in part of feltable fibers, which includes the steps of introducing the batt into the nip of a pair of rolls, rotating the rolls to feed the batt through the nip, wetting the batt to the point of saturation, and subjecting at least one of the rolls to oscillations at a high frequency at the rate of from about 3600 to about 7200 complete oscillations per minute.

13. The method of fulling a batt composed at least in part of feltable fibers, which includes the steps of introducing the batt into the nip of a pair of rolls while leaving both surfaces of the batt free and unconfined on both sides of the nip, rotating the rolls to feed the batt through the nip, wetting the batt to the point of saturation and subjecting at least one of the rolls to vibrations at a high frequency of the order of several thousands of complete vibrations per minute.

14. The process of treating textile fabrics composed at least in part of feltable fibers which is characterized by subjecting the fabric to pressure, heat and vibration of an amplitude of one-sixteenth to three-eighths inches at a rate of the order of several thousands of complete vibrations per minute.

15. The process of treating fabric composed at least in part of feltable fibers which comprises the steps of continuously feeding the fabric in open width condition and subjecting its fibers in consecutive areas first to a series of rapid vibratory pressure pulsations in a transverse direction and thereafter to a series of rapid oscillatory pressure pulsations longitudinally of the fabric.

16. The process of treating fabric composed at least in part of feltable fibers which comprises the steps of continuously advancing the fabric in open width condition by engagement with its margins only, and subjecting its intermediate area to vibratory pressure at a rate of at least 1800 complete vibrations per minute.

17. The process of making felt which is characterized by the steps of subjecting consecutive limited areas of a preformed batt composed at least in part of feltable fibers to heat and vibratory pressure at a rate of at least 1800 complete vibrations per minute, and continuously introducing loose fibers to the treated areas of the batt and incorporating them therein.

18. The process of making felt which is characterized by the steps of subjecting consecutive limited areas of a fibrous batt composed at least in part of feltable fibers to vibratory pressure at a rate of at least 1800 complete vibrations per minute and an amplitude between one-sixteenth and three-eighths inches, and continuously introducing loose fibers of a different character from those of the batt at each area under treatment and incorporating them in the surface of the resulting product.

19. Apparatus for treating textile fabric in open width condition, comprising cooperating pressure elements including a roll, mechanism for imparting rapid vibrations to the roll, and a weight resiliently connected to the roll.

20. Apparatus for treating textile fabric in open width condition, comprising cooperating pressure elements including a roll, a motor for imparting rapid oscillations to the roll, and a weighted mass resiliently connected to the roll and acting on the roll in resonance with its motivated oscillations.

21. Apparatus for treating textile fabric in open width condition comprising a drum arranged for rotation about a horizontal axis, a shaft to which the drum is connected, means for imparting to the shaft and drum vibrations at a high rate, and fabric feeding disks mounted for free rotation on the shaft at both ends of the drum.

22. Apparatus for treating textile fabric in open width condition comprising a drum arranged for rotation about a horizontal axis, a shaft to which the drum is connected, means for imparting to the shaft and drum rotary oscillations at a high rate, and fabric feeding disks mounted on the shaft for continuous rotation independently of the oscillatory movement of the drum.

23. Apparatus for treating textile fabric in open width condition comprising a pair of rotary rolls arranged to compress the fabric between them, driving mechanism imparting a continuous rotary feeding movement to one of said rolls, separate means for imparting high speed vibration to the other of said rolls and a secondary weighted mass resiliently connected to said latter roll and vibrating in resonance therewith.

24. The process of fulling felt fabric and at the same time maintaining its full initial width, which comprises the steps of subjecting consecutive areas of the fabric in open width condition to vibratory pressure at a rate of approximately 3600 complete vibrations per minute and of an amplitude of approximately one-sixteenth inch.

25. The continuous process of fulling felt fabric to secure uniformity of texture, which comprises the steps of subjecting successive narrow working areas of the fabric, in open width condition, to vibratory pressure at a rate of the order of several thousands of complete vibrations per minute and an amplitude of not over one-sixteenth inch, and wetting out the fabric at each working area therein.

26. The process defined in claim 25 in which the wetting liquid is collected from the fabric as it emerges from the working area.

27. The process for finishing woven woolen fabric which comprises the steps of advancing the fabric continuously in open width condition, heating the fabric, moistening the fabric and subjecting successive narrow working areas thereof to vibratory pressure of amplitude less than one-sixteenth inch and at a rate of approximately 3600 complete vibrations per minute.

28. The process of interfelting the fibers of a textile web which includes the steps of continuously advancing the web in the direction of its length, moistening the web, rigidly confining the opposite surfaces of a narrowly limited transverse area of the web by engaging one surface of said area of the web and flexing the engaged portion convexly while supporting the opposite surface of said area as it is flexed concavely, and simultaneously transmitting vibrations through the surfaces so engaged.

29. The method as defined in claim 28 in which the vibrations that are thus transmitted are of a high frequency of the order of thousands of vibrations per minute.

30. In apparatus adapted to interfelt the fibers of a textile web continuously in one pass, the combination of a continuously moving support for the web during interfelting having a limited area adapted to support a correspondingly limited area of the web at one time, a rigid presser element positioned to apply pressure to a portion at least of said limited area of the supported web, and means for vibrating said presser element so that the web is vibrated as it is pressed, the adjacent surfaces of the support and the presser element being conformingly curved so that the web is flexed while it is being pressed and vibrated.

31. The process of making felt which includes the steps of engaging a heated and moistened batt under pressure between longitudinally moving belts, holding one of said belts against lateral movement, and imparting positive lateral vibration to the other belt in a transverse zone of limited area.

32. The process of making felt which includes the steps of engaging a batt under conditions of heat and pressure between opposed belts, advancing the belts simultaneously at a continuous and uniform rate of speed, and imparting positively to one belt only rapid lateral vibrations in a zone of limited area.

33. The process of making felt which includes the steps of engaging the opposite faces of a batt under conditions of heat and pressure between elastic belts presenting continuous rubberized surfaces to the batt, advancing the two belts continuously, meanwhile holding one belt against lateral movement and imparting positively to the other belt rapid lateral vibrations in a narrow zone, said vibrations being restricted to that zone by the elastic nature of the belt.

34. The process of making felt which includes the steps of advancing a batt of loose fibers continuously between opposed, longitudinally moving conveying bands, directing the bands in convergent paths thus gradually reducing the thickness of the batt to minimum thickness in a narrow transverse zone, and then subjecting one of the moving bands to positive lateral vibration in said zone.

35. Felt making apparatus including a moistening station, a corrugated transversely vibrating member, and conveying means for advancing a batt first through the moistening station and then into range of the said vibrating member, said conveying means including a corrugated band keyed to the said member and vibrated thereby.

36. Felt making apparatus including a pair of rubberized conveyor bands longitudinally corrugated in their outer faces, a corrugated roll supporting said bands, and a laterally vibrating shoe having a corrugated concave face keyed to the upper band and imparting pressure and vibration thereto.

37. Apparatus for compacting and arranging the fibers of a textile web, comprising a web-feeding conveyor band movable in a longitudinal path and held against lateral vibration, a device presenting a rubberized surface to the web and being mounted directly to engage the web under pressure against said conveyor band in a transverse area substantially less in length than the width of the web, and mechanism for imparting to said device lateral vibrations of an amplitude between 0.08 and 0.375 inch at a rate between 1800 and 10,000 complete oscillations per minute.

38. The process of compacting and arranging the fibers of a textile web which includes the steps of continuously advancing a web, subjecting it to heat, moisture and pressure between opposed rubberized surfaces, one of which supports and advances the web and is held against lateral movement, and the other of which engages the web in a narrow transverse area of substantially less length than the width of the web and is positively vibrated transversely with an amplitude between 0.08 and 0.375 inch at a rate between 1800 and 10,000 complete oscillations per minute.

39. In a felting apparatus, cooperating pressure elements including a roll, a motor for imparting rapid axial vibrations to the roll, a weight resiliently connected to the roll and acting on the roll in resonance with the motivated axial vibrations.

References Cited in the file of this patent
UNITED STATES PATENTS

| | | |
|---|---|---|
| 1,533,349 | Genest | Apr. 14, 1925 |
| 1,720,574 | Schieferstein | July 9, 1929 |
| 1,984,701 | Reynolds | Dec. 18, 1934 |
| 2,093,709 | Casse | Sept. 21, 1937 |
| 2,169,372 | Pecker | Aug. 15, 1939 |
| 2,262,268 | Chatfield | Nov. 11, 1941 |
| 2,325,301 | Bohm | July 27, 1943 |
| 2,441,390 | Boeddinghaus | May 11, 1948 |
| 2,470,453 | Alexander | May 17, 1949 |
| 2,496,873 | Hoffman | Feb. 7, 1950 |
| 2,594,497 | Robinson, Jr. | Apr. 29, 1952 |
| 2,604,503 | Smith | July 22, 1952 |
| 2,616,153 | Freyer et al. | Nov. 4, 1952 |
| 2,632,229 | Mezzera | Mar. 24, 1953 |

FOREIGN PATENTS

| | | |
|---|---|---|
| 488,487 | Great Britain | July 7, 1938 |
| 659,412 | Germany | May 3, 1938 |